(12) United States Patent
Binot

(10) Patent No.: US 7,244,362 B2
(45) Date of Patent: Jul. 17, 2007

(54) WATER TREATMENT BY BALLASTED FLOCS AND DEGREASING

(75) Inventor: Patrick Binot, Rentilly Par Bussy (FR)

(73) Assignee: OTV S.A. (FR)

( * ) Notice: Subject to any disclaimer, the term of this patent is extended or adjusted under 35 U.S.C. 154(b) by 240 days.

(21) Appl. No.: 10/467,134

(22) PCT Filed: Feb. 8, 2002

(86) PCT No.: PCT/FR02/00502

§ 371 (c)(1),
(2), (4) Date: Feb. 11, 2004

(87) PCT Pub. No.: WO02/064513

PCT Pub. Date: Aug. 22, 2002

(65) Prior Publication Data

US 2004/0129642 A1    Jul. 8, 2004

(30) Foreign Application Priority Data

Feb. 9, 2001 (FR) .................................. 01 01833

(51) Int. Cl.
*C02F 1/52* (2006.01)
(52) U.S. Cl. ...................... 210/714; 210/727; 210/738; 210/787
(58) Field of Classification Search ................ 210/710, 210/711, 713, 714, 708, 724, 725, 727, 738, 210/787, 788
See application file for complete search history.

(56) References Cited

U.S. PATENT DOCUMENTS

| 4,927,543 | A | * | 5/1990 | Bablon et al. | 210/711 |
| 5,061,375 | A | * | 10/1991 | Oyler | 210/744 |
| 5,382,369 | A | * | 1/1995 | Vion | 210/726 |
| 5,569,379 | A | * | 10/1996 | Schloss | 210/257.1 |
| 5,770,091 | A | | 6/1998 | Binot et al. | 210/711 |
| 6,383,370 | B1 | * | 5/2002 | Keever et al. | 210/96.1 |
| 6,447,686 | B1 | * | 9/2002 | Choi et al. | 210/666 |
| 6,485,652 | B1 | * | 11/2002 | Le Poder et al. | 210/713 |
| 6,645,386 | B1 | * | 11/2003 | Moreau et al. | 210/711 |
| 6,824,692 | B2 | * | 11/2004 | Binot et al. | 210/709 |

FOREIGN PATENT DOCUMENTS

DE            19527290 A1    1/1997

* cited by examiner

*Primary Examiner*—Peter A. Hruskoci
(74) *Attorney, Agent, or Firm*—Coats & Bennett, P.L.L.C.

(57) ABSTRACT

The invention concerns the use of a coagulation-flocculation-decantation device for water treatment to degrease water inside the device itself so as to eliminate therefrom more than 20% of hexane-extractable matter without resorting to separate degreasing means by flotation. The invention also concerns a plant comprising a coagulation-flocculation-decantation device by ballasted flocs having a coagulation zone (1), means supplying (4) a granular material denser than water (4), a flocculation (6), a decantation zone (8) and means for recycling (15) granular material including at least a hydrocyclone (17). The characterised in that it does nut comprise degreasing means provided upstream of the coagulation-flocculation-decantation device, the grease being removed from the water inside the coagulation-flocculation-decantation device itself without means for injecting air or an equivalent gas.

5 Claims, 1 Drawing Sheet

WATER TREATMENT BY BALLASTED FLOCS AND DEGREASING

Figure 1:
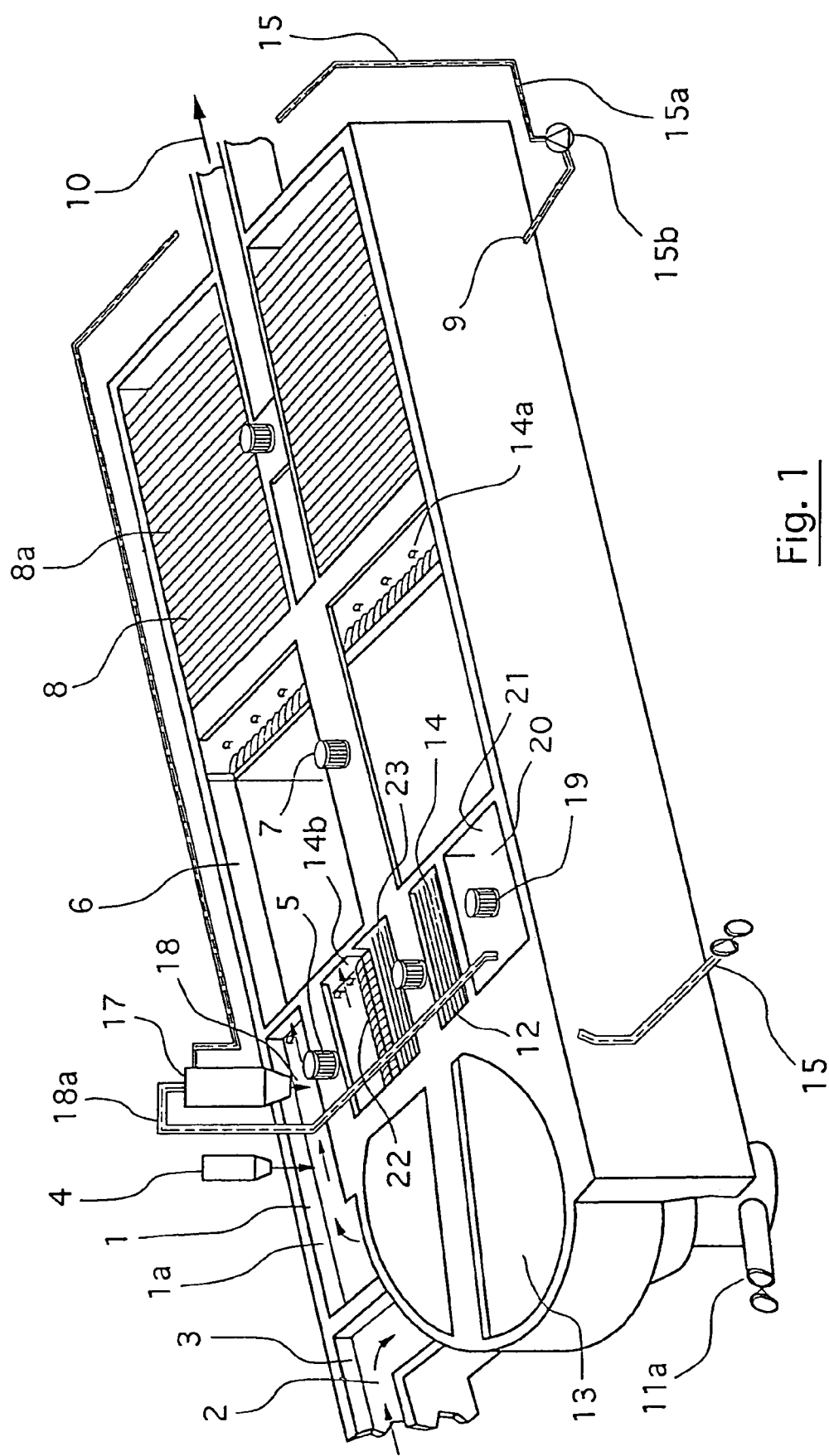

This application is a U.S. National Stage application of PCT Application No. PCT/FR02100502, with an international filing date of Feb. 8, 2002. Applicant claims priority based on French application serial no. 01 01833 filed Feb. 8, 2001.

Water treatment installation with flocs ballasted by granular material comprising integrated degreasing means.

Coagulation—flocculation—settlement installations used in conventional water treatment, particularly for the treatment of waste water, are traditionally used with grit removal and degreasing equipment and the treatment system on sludge that they generate.

This type of installation is preceded on the upstream side by devices removing grit from the raw water to prevent entrainment of large quantities of coarse and abrasive particles into the water treatment and sludge treatment steps on the downstream side of grit removal. These grit removal devices are traditionally sized to remove sand with particle size larger than 200 micrometers at the nominal operating flow of the installations.

Degreasing equipment is usually installed on the upstream side of the coagulation—flocculation—settlement installations, to limit the quantities of greasy material transferred to equipment on the downstream side. This type of greasy material can generate a number of nuisances, such as the creation of possibly grease balls that could cause clogging, or deposits on settlement strips of lamellar settling tanks, or the occurrence of bacterial bulking in active sludge units. Degreasing usually takes place by flotation, in other words by air injection, frequently in the grit removal equipment, in this case designed to operate at mirror speeds of the order of 10 to 20 m/h. Degreasing removes about 20% of hexane extractible material contained in the raw water.

Finally, these coagulation-flocculation-settlement installations are often used with a sludge thickening system on the downstream side, that may be independent or may be integrated in the bottom of the settlement zone. When this system is independent, there is a disadvantage in that a special civil works structure has to be built, with the need for recirculating pumps for the sludge to be thickened and thickener weirs. When the thickening system is integrated, there is the disadvantage that the sludge has a long residence time in the settlement tank, which is not conducive to obtaining an excellent quality clarified water.

According to one improved type of coagulation—flocculation—settlement installation, means of providing at least one granular material denser than water such as sand is provided so as to ballast the flocs and thus encourage and accelerate settlement of the flocs. Such a device called a ballasted flocs device is described particular in French patent FR-2627704 published by the Applicant on Dec. 13, 1991.

This invention relates precisely to this type of improved installation using granular ballasting material.

The purpose of this invention is to propose a new water treatment process using a coagulation—flocculation—settlement ballasted flocs installation to considerably reduce the size of the corresponding installation.

More precisely, the purpose of this invention is to considerably reduce the number of items of equipment and civil works necessary for treatment of an effluent by combining all or some of the grit removal, degreasing, coagulation and settlement operations, or other gravity separation means such as cycloning and thickening in the same structure.

These objectives are achieved in the invention that relates to a new use of the coagulation—flocculation—settlement device using flocs ballasted by microsand or an equivalent material for water treatment characterised in that it consists of degreasing the said water within the said device, so as to eliminate more than 20% of the hexane extractable material, without the need to use separate degreasing installations by flotation.

The Applicant has observed that, surprisingly and unexpectedly to a person skilled in the art familiar with reduction ratios of the order of 20% of hexane extractable material (HEM) using normal degreasing methods, the technique consisting of flocculation-settlement by ballasted floc can reduce the inflowing HEM by more than 20%, typically by 50 to 60% of the inflowing HEM.

This property means that the traditional air degreasing step can be eliminated entirely, with grease being largely eliminated by ballasting the floc, and then extracted with sludge.

It will be noted that the idea of combining some degreasing and grit removal steps around a recirculated sludge ballasted floc settlement tank has already been proposed in the state of the art but has not succeeded in eliminating the need for degreasing with air injection which requires a large grit removal—degreasing surface zone if it is to be efficient, and which causes a risk of disturbing later settlement of sand free flocs due to entrainment with air bubbles, if the grit removal—degreasing surface zone is reduced, by reducing its efficiency to reduce its foot print.

Preferably, the new use according to the invention consists of degreasing the said water within the said device so as to eliminate more than 50% of hexane extractable materials.

According to one advantageous variant, the invention also consists of at least partially removing grit from the said water within the coagulation—flocculation—settlement device.

Preferably, the said coagulation—flocculation—settlement device is used with coarse fast upstream grit removal devices with a cutoff capacity of between 200 and 300 micrometers operating at a surface speed of more than 15 m/h, and preferably between 80 and 200 m/h.

The invention also relates to the entire water treatment installation including a coagulation—flocculation—settlement device with flocs ballasted by microsand or an equivalent material, characterized in that it does not comprise degreasing means provided on the upstream side of the coagulation—flocculation—settlement device, the said water being degreased within the coagulation—flocculation—settlement device without any air injection or equivalent gas injection means.

Preferably the said device includes:
  at least one coagulation zone provided with water inflow means, means of adding at least one coagulating reagent, means of adding at least one granular material denser than water, and stirring means;
  at least one flocculation zone provided with stirring means; and
  at least one settlement zone or at least one gravity separation zone by cycloning or vortex effect, provided with a sludge recuperation and evacuation zone and means of taking away the clarified water,
  means of recycling at least part of the granular material contained in the said sludge to the said flocculation chamber including at least one hydrocyclone.

According to one variant, the installation according to the invention does not also include any grit removal means by flotation provided on the upstream side of the coagulation—flocculation—settlement device, grit being removed from the said water by the said coagulation—flocculation—settlement device.

According to another variant, the said installation includes upstream means of fast grit removal from the said water, with a cutoff capacity of between 100 and 300 micrometers.

This type of grit removal means will be used when the quantity of coarse sand in the raw water entrains a risk of excessively fast accumulation of sand in the installation that will be difficult to manage by periodic deconcentration of sand in the ballasted floc flocculator—settlement tank.

Preferably, the said fast grit removal means are of the cycloning effect or vortex effect type.

Preferably, these grit removal means will be used with residence times of the order of 1 minute and with settling velocities of between 80 and 300 m/h.

The grit removal means may form the coagulation zone, the coagulating agent then being injected into the said grit removal means or on the upstream side of these grit removal means, and being brought into intimate contact with the colloids to be destabilized in high speed grit removal means.

Also preferably, the installation includes integrated means of thickening at least part of the effluent originating from the said hydrocyclone.

These thickening means may be directly contiguous with one of the coagulation flocculation works or on the upstream side of these works. Thus, these thickening means may be integrated without any pumping complementary to the pumping for recycling of sludge. Therefore, this arrangement is a means of having sludge thickening integrated into the structure while avoiding operations difficulties related to sludge thickening directly at the bottom of the settlement tank.

According to one variant of the invention, the said thickening means are preceded by a degassing zone. This degassing zone may be in any form capable of separating sludge from gas that it trapped during hydrocycloning, such as a specific pond or all or some of the channel conducting the hydrocycloned sludge to the said thickening means.

According to one interesting variant of the invention, the said integrated thickening means comprise at least one settlement column provided in its upper part with settlement strips, and in its lower part with evacuation of thickened sludge, and at least one inlet channel for at least part of the outgoing flow from the hydrocyclone into the said settlement column.

Preferably the said integrated thickening means are provided with means of adding at least one flocculating reagent.

Also preferably, these means also include at least one upstream flocculation tank.

Thickening of sludge output from ballasted floc decantation and already containing large quantities of polymer, surprisingly can achieve drynesses of 20 to 60 or more g/l which is unexpected according to the state of the art, for very high loads on the apron of at least 100 kg SS/m_ of raft/day more than the value usually used for the design of thickeners, and possibly up to more than 2000 kg SS/m_/day, to the extent that sludge is quickly reflocculated on the upstream side of the thickener, and that the strips can keep the Hazen velocity over weirs below a value dependent on the required quality for these weirs (between about 2 and 10 m/h).

Preferably, the installation also includes integrated means of recuperating float materials passing through the coagulation zone and/or the flocculation zone.

In particular, such means may be composed of any means known to an expert in the subject, such as pivoting ducts, periodic means of raising the water level to a float material extraction overflow, or a surface skimming device placed at float accumulation point(s).

Advantageously, the installation is provided with a hydrocycloned sludge degassing zone that may or may not be coincident with the flocculation zone.

The invention and its various advantages will be easily understood after reading the following description of one non-limitative embodiment of the invention, with reference to the single figure.

With reference to the figure, the installation comprises a coagulation—flocculation—settlement device in series, comprising a coagulation chamber 1 provided with a stirrer 5, and at least one flocculation chamber 6 provided with stirring means 7 and a settlement tank 8.

Conventionally, this device is provided with means 4 for distributing a granular floc ballasting material, in this case sand, and stirring means 5.

The settlement tank 8 is fitted with strips 8a (other embodiments would be possible without strips), in its lower part there is a sludge evacuation and recuperation zone 9, and in its upper part there are clarified water outflow means. Means of recuperating floating materials 14a are provided at the inlet to settlement tank 8.

The installation comprises recycling means 15 for the granular material recovered from the recuperation and evacuation zone 9 of the settlement tank 8. A pipe 15a cooperating with a pump 15b directs sludge recovered at 9 to a hydrocyclone 17 provided with distribution means 18 for the granular material separated in the coagulation chamber 1.

According to this invention, the installation comprises means 3 of injecting a coagulating reagent at the inlet to the inflow means carrying the water to be treated 2, followed by coarse grit removal means 13 with a cut off capacity of 300 μm. The lower part of the grit removal device 13 contains means 11a of evacuating sand and gravel towards a sand treatment plant (not shown).

Also according to the invention, the installation is provided with a pipe 18a that diverts part of the flow from the hydrocyclone 17 to thickening means 12 including a settlement tank 14, provided with strips 23 in its upper part and a clarified effluent evacuation 22 towards the coagulation chamber 1, and in its lower part provided with thickened sludge evacuation means 16 leading to the said treatment plant. Thickening means also comprise an upstream flocculation tank 20 (possibly serving the degassing zone) provided with stirring means 19 and means 21 of injecting a flocculating reagent.

According to the invention, there are no effluent degreasing means on the upstream side of the coagulation—flocculation—settlement device. Furthermore, there are no degreasing means including injection of air or an equivalent gas into the effluent.

It will be noted that all elements shown in the figure are integrated into the same civil structure.

The installation operates as follows.

The effluent entering into the installation through the inflow means 2 is routed to the grit removal device 13 where the particles (sand) contained in it are larger than about 300 μm and are separated and collected in the form of pretreatment sand to be evacuated at 11a. A coagulating reagent is injected into the water using means 3, before reaching the grit removal device 13.

The effluent then passes into the injection zone in which a polymer is added, and then into the flocculation zone 6 and then into the lamellar settlement tank 8. The degreased, degritted and cleaned effluent is evacuated at 10.

Sludge collected by the lamellar settlement tank 8 is transferred to the hydrocyclone 17 to retrieve most of the ballasting material and to reroute it by means 18 into the injection chamber 1. At least some of the overflow from the hydrocyclone is sent through the pipe 18*a* to thickening means 12. Sludge from these means is evacuated by means 16, while the overflow 22 is transferred to the injection chamber 1.

The installation described herein will degrease, degrit and clean water within a much smaller volume than was possible with prior art that required the use of degreasing means on the upstream side.

The degreasing step is intrinsically and surprisingly carried out within the ballasted floc settlement. Grit removal is efficiently and intrinsically completed, by ballasted settlement, to eliminate almost all sand from treated water by making it settle at high speed (more than 15 m/h, usually between 80 to 200 m/h) with the floc, while hydrocycloning prevents sand larger than its cutoff threshold, well below the value of 200 micrometers usually required from grit removal and usually of the order of 30 to 100 micrometers, from departing with the sludge.

The embodiment of the invention described in this presentation is not intended to reduce the scope of the invention. Many modifications could be made to it without going outside its scope.

The invention claimed is:

1. A method of degreasing water or wastewater in the course of treating water or wastewater, comprising: subjecting the water or wastewater to treatment by flocs ballasted by granular material and directing the water or wastewater through coagulation, flocculation and sediment devices, and degreasing the water or wastewater within the coagulation, flocculation and sediment devices and eliminating at least 20% of hexane extractable material from the water or wastewater without subjecting the water or wastewater to flotation degreasing means.

2. The method of claim 1 including eliminating more than 50% of hexane extractable materials from the water or wastewater.

3. The method of claim 1 including at least partially removing grit from the water or wastewater.

4. The method of claim 3 including utilizing a coarse grit removal device upstream from the coagulation, flocculation and sediment devices and operating the coarse grit removal device at a settling speed of more than 15 m/h.

5. The method of claim 4 including operating the coarse grit removal device at a settling speed between 80 and 200 m/h.

* * * * *